United States Patent
Bhattacharjee et al.

(10) Patent No.: US 8,458,191 B2
(45) Date of Patent: Jun. 4, 2013

(54) METHOD AND SYSTEM TO STORE RDF DATA IN A RELATIONAL STORE

(75) Inventors: Bishwaranjan Bhattacharjee, Yorktown Heights, NY (US); Kavitha Srinivas, Rye, NY (US); Octavian Udrea, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 12/724,211

(22) Filed: Mar. 15, 2010

(65) Prior Publication Data

US 2011/0225167 A1    Sep. 15, 2011

(51) Int. Cl.
*G06F 7/00* (2006.01)
*G06F 17/30* (2006.01)

(52) U.S. Cl.
USPC .................... 707/747; 707/801; 707/802

(58) Field of Classification Search
USPC ............ 707/705, 736, 741, 747, 790–793, 707/796, 800–802, 809
See application file for complete search history.

(56) References Cited

U.S. PATENT DOCUMENTS

| | | | | |
|---|---|---|---|---|
| 6,067,547 | A * | 5/2000 | Douceur | 707/100 |
| 6,950,834 | B2 * | 9/2005 | Huras et al. | 707/610 |
| 7,349,919 | B2 * | 3/2008 | Russell et al. | 707/102 |
| 2003/0145022 | A1 | 7/2003 | Dingley | |
| 2004/0167904 | A1 | 8/2004 | Wen et al. | |
| 2005/0223022 | A1 | 10/2005 | Weissman et al. | |
| 2006/0235823 | A1 | 10/2006 | Chong et al. | |
| 2007/0198541 | A1 | 8/2007 | Betz et al. | |
| 2008/0126397 | A1 | 5/2008 | Alexander et al. | |
| 2009/0024654 | A1 | 1/2009 | Zhao et al. | |
| 2009/0132474 | A1 | 5/2009 | Ma et al. | |
| 2009/0138498 | A1 | 5/2009 | Krishnamoorthy et al. | |
| 2009/0292716 | A1 | 11/2009 | Oliver et al. | |
| 2011/0099173 | A1 * | 4/2011 | Chappell et al. | 707/741 |

FOREIGN PATENT DOCUMENTS

| | | |
|---|---|---|
| EP | 1546921 | 6/2005 |
| EP | 1938211 | 7/2008 |

OTHER PUBLICATIONS

Skitis, Nikolas; Fast and Compact Hash Tables for Integer Keys, Proceedings of the 32nd Austalasian Computer Science Conference (ACSC), Wellington, New Zealand, 2009, pp. 10.*
Wikipedia, Hash Table, http://web.archive.org/web/20091205071056/http://en.wikipedia.org/wiki/Hash_table, Dec. 5, 2009, pp. 18.*

(Continued)

*Primary Examiner* — Marc Somers
(74) *Attorney, Agent, or Firm* — Preston J. Young, Esq.; McGinn IP Law Group, PLLC

(57) ABSTRACT

A method (and structure) of storing schema-less data of a dataset in a relational database, includes constructing a hash table for the schema-less data, using a processor on a computer. Data in the dataset is stored in a tuple format including a subject along with at least one other entity associated to the subject. Each row of the hashtable will be dedicated to a subject of the dataset, and at least one of the at least one other entity associated with the subject in the row is to be stored in a pair-wise manner in that row of the hashtable. In an exemplary embodiment, RDF data that uses triples (subject, predicate, object) is stored with the predicate/object stored in the pair-wise manner in its associated subject row.

22 Claims, 9 Drawing Sheets

OTHER PUBLICATIONS

Wikipedia, Dynamic Array, http://web.archive.org/web/20090216213559/http://en.wikipedia.org/wiki/Dynamic_array, Feb. 16, 2009, pp. 5.*

Pan, et al., DLBD:Extending Relational Databases to Support Semantic Web Queries, Technical Report, Lehigh University, http://citeseerx.ist.psu,edu/viewdoc/download?doi=10.1.1.62 2839&rep=rep1&type=pdf, 14 pgs.

Kevin Wilkinson, Jena Property Table Implementation, 2006, http://www.hpl.hp.com/techreports/2006/HPL-2006-140 html, 14 pages.

* cited by examiner

100

| S | P | D |
|---|---|---|
| ArticleId | hasTitle | Title |
| ArticleId | hasAuthor | Author |
| ArticleId | hasDate | Date |
| ArticleId | hasMetadata | Children |
| ArticleId | hasMetadata | Lung |

| | |
|---|---|
| Number of triples | ~ 136.9 million |
| Predicates | min: 1, max: 927, avg: 4.85, stdev: 8.09 |
| Values per subject, predicate pair | min: 1, max: 7176, avg: 2.63, stdev: 20.8 |
| % of subject, property pairs with single value | 81.93% |
| % of records with < 128 predicates | 98.3% |

(Testbed: DBPedia 3.1)

| ID | Metadata |
|---|---|
| | Children |
| | Lung |

| Subject | Pred$_1$ | Val/Ref$_1$ | ... | Pred$_N$ | Val/Ref$_N$ | Bitmap |
|---|---|---|---|---|---|---|
| Hawthorne | locatedIn | NY | ... | borders | 3234167 | 000...1 |

| Subject | Pred$_1$ | Val/Ref$_1$ | ... | Pred$_N$ | Val/Ref$_N$ | Bitmap |
|---|---|---|---|---|---|---|
| Hawthorne | locatedIn | NY | ... | borders | 3234167 | 000...1 |

900

| SubjectPredicateID | Value$_1$ | Value$_2$ | ... | Value$_N$ |
|---|---|---|---|---|
| 3234167 | Mt Pleasant | Elmsford | ... | Thornwood |

FIGURE 9

(1) primary hash ::= (resource, bitmap, property1, value1,... ,propertyi, valuei,... ,propertyN, valueN)

(2) secondary hash ::= (res prop id, value1,... ,valuej,... , valueM)

(3) overflow ::= (subject, predicate, object, reverse)

(4) long names :; = (resource, md5)

(5) rev primary hash ::= (resource, bitmap, property1, value1,... ,propertyi, valuei,... ,propertyN', valueN')

(6) rev secondary hash ::= (res prop id, value1,... ,valuej,... , valueM')

METHOD AND SYSTEM TO STORE RDF DATA IN A RELATIONAL STORE

BACKGROUND OF THE INVENTION

1. Field of the Invention

The present invention generally relates to improving efficiency in query searches of RDF and/or other schema-less data in a relational database. More specifically, a hash table is created so that each subject (or object) of the schema-less database can be represented in a row in the hash table, and a hash function is then used to insert predicate/object data related to that subject as units into that row into adjacent pairs of columns, such that the first column of a column pair stores a predicate and the next adjacent column stores the value associated with that predicate.

2. Description of the Related Art

The Resource Description Framework (RDF) is a family of World Wide Web Consortium (W3C) specifications originally designed as a metadata data model and has become the lingua franca for both information extracted from unstructured data, such as with OpenCalais, as well as for information with a natural graph representation, such as DBPedia and UniProt. RDF has come to be used as a general method for conceptual description or model of information that is implemented in web resources, using a variety of syntax formats.

RDF provides a way to express linked data: Subject—Property—Object (Value). As an example, "IBM hasLocation Hawthorne" might be expressed in RDF as a triple (IBM, hasLocation, Hawthorne).

FIG. 1 shows exemplarily how RDF data 100 stored in a relational store is generally stored as a triple 101, each triple 101 having a subject 102, predicate 103, and object (e.g., metadata) 104. The subject denotes the resource, and the predicate denotes traits or aspects of the resource and expresses a relationship between the subject and the object. As an initial matter, it is noted that, in the art as well as in this description, the word "property" is sometimes used instead of "predicate", and an "object" is also sometimes alternatively referred to as the "data", "value", or "metadata" associated with a predicate and/or subject. An RDF database D is a set of triples of the form (subject, predicate, object), where the subject and predicate are drawn from a set R of resources. A resource is any entity that can be denoted by a Uniform Resource Identifier (URI). The object is either a resource or a primitive value such as an integer, string, floating-point number, etc.

It is noted at this point that a more generic schema-less data scheme would use tuples rather than the format based on triples such as demonstrated by the RDF scheme used to describe the method of the present invention. Thus, for example, a tuple will contain a subject that is then interrelated to other components defined in that tuple. Other schema-less data representations include, for example, key/value databases (e.g., CouchDB).

A second triple example, "Hawthorne is locatedIn New York", represented as triple (Hawthorne, locatedIn, New York), demonstrates how RDF triples can form a natural graph structure that interconnect triples. In this case, the second triple involves and extends the first example, noting that IBM is located in Hawthorne, which is located in New York, a relationship that lends itself to a graph. Thus, RDF is ideally suited for representing information extracted from unstructured sources, such as DBPedia, or graph-based information, such as uniProt.

In general, there could be 1-to-1 or 1-to-many relationals for a subject and predicate, so that, in general, not all predicates would be applicable for a subject and the number of predicates for subjects can vary widely. Queries could be expected for a particular subject or predicate or object. Arguably, the most widely supported RDF query language is SPARQL, although there is no single standard query language for RDF databases.

Answering these queries in a conventional manner in an RDF database results in a lot of joins and self-joins and is difficult to optimize. A self-join is a condition that occurs when a table is joined to itself, based on some join condition. These joins allow a user to retrieve related records in one table, but joins and self-joins slow down query processing in conventional RDF database searches. Thus, in FIG. 1, subject "Articleid" represents the same subject for all five triples shown, so a self-join exists for this subject ArticleId 102 having five predicates 103, if this listing were a table in a database.

FIG. 2 demonstrates a summary 200 of an exemplary RDF store (i.e., DBPedia 3.1, an RDF dataset used for Wikipedia) analyzed as a testbed, in which there were 136.9 million triples, with the number of predicates associated with any given subject varying in number between 1 (minimum) to 927 (maximum), with the number of objects (values) of any given subject/predicate pair varying from a minimum of 1 value to a maximum of 7,176 values. Of significance in this data is that almost 82% of the triples had a single value, and almost 99% of the triples had no more than 128 predicates.

A possible way to reduce self-joins in query processing is to convert a triple store into a single property table, where all the predicates are listed for a subject, such as exemplarily shown in the property table 300 of FIG. 3. However, this is not feasible in practice since the predicates tend to be sparse and not all subject/predicates are 1-to-1. More important, a database engine does not support that many columns.

For example, in DB2 (a relational model database management system developed by IBM), a table with about 1012 columns for page sizes of 8 to 32 K can be defined. In the above example having up to 7,176 values for any given subject/predicate pair, we will need at least that many columns in a naive scheme, which would not be possible with current database engines. To make it possible, one would have to break things up into multiple tables and that would hugely complicate processing.

Even if that is possible, most of the values would be null since, in the exemplary dataset described by FIG. 2, although up to 927 predicates exist for any specific subject, most have fewer than 5. So the space consumption would be huge and query processing efficiency would suffer.

Another possibility is the article/metadata property table 400 shown in FIG. 4. However, this second approach leads to multiple property tables, thereby making processing complicated.

As noted, RDF is becoming common for the representation of unstructured data that has been converted into structured tuples. There is a burgeoning amount of RDF data on the web, either in the form of extracts of semi-structured data from Wikipedia, such as the DBpedia data described above, extracts from unstructured data, such as OpenCalais for Reuters produces and houses RDF for newsfeeds (1 million web service requests to RDFified newsfeeds), the growing use of RDFa microformats to embed RDF in HTML, or extracts of relational data so it can be linked to other unstructured data (e.g., U.S. Census data). Other examples of RDF use include Linked Open Data (2 billion RDF triples), Twine from radar networks (billions of RDF triples), and Powerset, acquired by Microsoft produces RDF triples for Wikipedia.

An efficient RDF store is clearly important for storing and querying this form of schema-less data, and, from the above discussion, a need continues to exist to improve storage of RDF and/or other schema-less data in a relational store and to improve the efficiency of a query search over this data.

SUMMARY OF THE INVENTION

In view of the foregoing, and other, exemplary problems, drawbacks, and disadvantages of the conventional systems, it is an exemplary feature of the present invention to provide a structure (and method) in which RDF or other schema-less data can be stored and queried in a very efficient way in a relational database from the point of view of both the query processing and storage.

It is another exemplary feature of the present invention to provide a method that has the "look and feel" of existing relational database systems.

It is yet another exemplary feature of the present invention to provide a method that can be implemented with minimal impact on existing relational database systems.

It is yet another exemplary feature of the present invention to provide a method that compares favorably with processing efficiency of queries using the storage method of the present invention, relative to conventional query processing of schema-less datasets.

As will be explained shortly, in a first exemplary aspect, the present invention provides a method of storing schema-less data of a dataset in a relational database, including creating a hashtable for the schema-less data, using a processor on a computer, such that: data in the dataset is stored in a tuple format comprising a subject along with at least one other entity associated to the subject; each row of the hashtable will be dedicated to a subject of the dataset; and at least one of the at least one other entity associated with the subject is to be stored in a pair-wise manner in that row of the hashtable.

In a second exemplary aspect, also described herein is an apparatus that executes the above-described method.

In a third exemplary aspect, also described herein is a storage medium that tangibly embodies computer-readable instructions that permit a processor to execute the above-described method.

From the above brief description, one of ordinary skill in the art should now recognize that, using the methods to be further described hereinbelow, one could use a standard relational store to store RDF data and yet get great performance on query processing. The method gives very good performance in comparison to even native RDF stores, which is also a certain advantage, and the same techniques can be extended to other schema-less storage requirements, such as, for example, multi tenancy and document stores using one scheme.

BRIEF DESCRIPTION OF THE DRAWINGS

The foregoing and other exemplary features, purposes, aspects, and advantages will be better understood from the following detailed description of an exemplary embodiment of the invention with reference to the drawings, in which:

FIG. 1 provides a very simple example of an RDF dataset 100 for purpose of explaining terms and concepts;

FIG. 8 shows a more realistic example of a primary hashtable 800, including the bitmap component 801 used for data insertion and a condition where a single predicate 802 has multiple values;

FIG. 9 shows how the multiple-valued predicate 802 leads to the secondary hashtable 900 that lists these multiple values for the primary hashtable;

FIG. 10 shows formats 1000 of the various tables, including two additional auxiliary tables that could be generated as required for specific datasets and reverse hash tables;

EXEMPLARY EMBODIMENTS OF THE INVENTION

Figures 2, 3, 4:
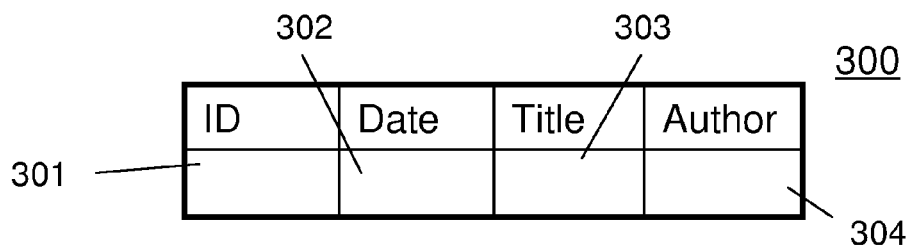
FIG. 2 provides summary data 200 for data and relationship characteristics of exemplary RDF datasets used as a test bed during development of the present invention.
FIG. 3 shows a possible data representation format 300 for schema-less data in a relational database.
FIG. 4 shows an alternate possible data representation format 400.

Referring now to the drawings, and more particularly to FIGS. 1-15, exemplary embodiments will now be explained.

The present invention relates to databases in which data is not stored in accordance with a scheme, meaning that there is no predefined schema. In a traditional relational database, one knows that a table has columns, and one can technically map each row to an instance of a class. The class has well defined methods, and well defined attributes. In contrast, in a schema-less system, one does not know what data is associated to a given information, somewhat like having a database table with an arbitrary and non-predefined number of columns, and every row can have data in any number of these columns.

The present invention outlines a method and system for storing and processing RDF triple data in a custom storage scheme. The method will allow for storing RDF triple data in a relational table in a property table while saving self-joins in query processing, as well as balancing space usage. It can be implemented in a relational system with minimal impact.

The method of the present invention allows a relational store to efficiently be able to store and process RDF triples, although it is noted that one having ordinary skill in the art would recognize that a similar method could be readily adapted for other types of schema less data, as expressed more generically in units of tuples rather than the triples used in the RDF format. To explain the method, the RDF store that was analyzed and briefly described above will be used as a running example for purpose of discussion.

Figures 5, 6, 7:
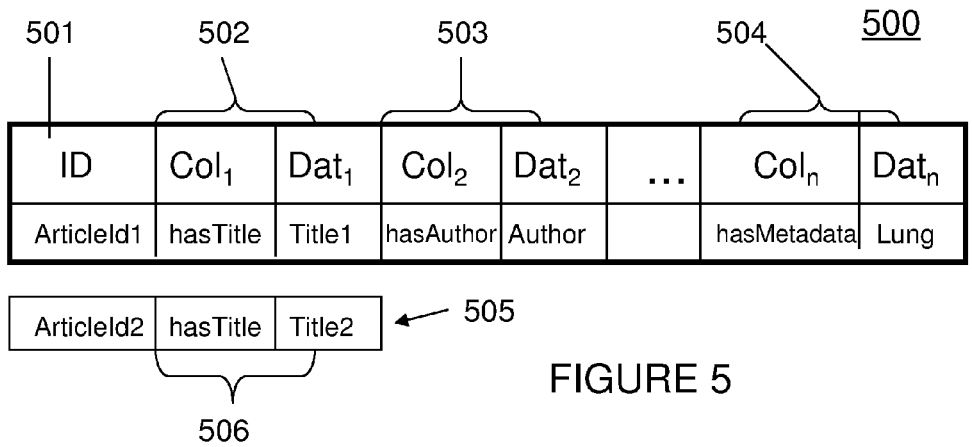
FIG. 5 exemplarily shows a hashtable 500 based on pairs of columns in a row dedicated to a subject, as constructed for RDF data in accordance with the method of the present invention, using part of the data shown in FIG. 1.
FIG. 6 shows an example 600 of hashing as used to insert predicates and metadata into the hashtable 500.
FIG. 7 shows an example 700 of dealing with hash function collisions during insertion of triples.

A key feature of the method of the invention is that a table, referred to herein as a "hashtable", is created, with a row in that hash table being dedicated to one subject in the RDF store. Predicates/objects of that subject will then be inserted pair-wise into columns of that subject's row. FIG. 5 shows an exemplary hash table 500 for part of the data of FIG. 1.

The first row (e.g., row 1, label 501) is dedicated to subject "ArticleId1", and the various exemplary predicates and associated values from triples having this subject are then inserted in this first row, in pairs 502-504. The second row 505 is dedicated to the next subject "ArticleId2", exemplarily having a single predicate/value pair 506, etc.

A key concern in designing the hashtable is the number of columns, since it presents an issue of efficiency, relative both to storage space utilization and to processing efficiency, including efficiency in retrieving rows of the table from disk memory for processing queries. That is, as noted in the RDF database characterized by FIG. 2, this dataset has a maximum of 927 predicates associated with any one subject and up to a maximum of 7,176 object values associated with any one subject, so that, even assuming that all the predicates had a single value, the number of columns necessary in a hashtable to cover all predicates of any subject in this dataset would be $(2 \times N)+1=2 \times 927+1=1855$ columns. As mentioned above, the DB2 database engine can handle about 1012 columns for page sizes of 8 to 32 K, so that this dataset described by FIG. 2 could not be completely stored in a hashtable using DB2.

However, as noted in FIG. 2, most subjects had 5 or fewer predicates with many having only one predicate, so that using a large number of columns in the hashtable would clearly result in many blanks, an inefficient use of space. Moreover, during query processing, it would ideal to be able to extract in a single memory operation an entire row of the hashtable from disk memory (e.g., page sizes of 8 to 32 K). The above example clearly would result in a number of columns that contain too much data for a single memory operation for data retrieval of a row of data related to a single subject.

There are several different approaches that would work to keep the number of columns in the hashtable manageable for memory retrievals and space utilization. For example, the hashtable could contain multiple rows for each subject, as appropriate. The disadvantage of this approach is that subjects having many predicates would occupy many rows in the table, making it more difficult to quickly search these subjects quickly. A second and preferred approach is that of designing the number of column pairs in the hashtable to respect various constraints including a constraint on memory retrieval of an entire row, a factor that can be easily implemented by the computer program itself, since the maximum page size can be provided to the program. Other techniques of the present invention related to controlling the number of columns (e.g., column pairs) include the capability of providing for an overflow of data in a subject row, since only a few subjects have large numbers of predicates and/or objects, and the capability of listing in a secondary table the various values for any predicate having more than one object or having extremely long values, such as string data, as objects. These techniques are shown in FIGS. 8-10 and will be discussed in more detail shortly.

However, returning to the use of a hash function to insert predicate/object data into table 500, FIG. 6 shows that the hash function has designated column 2 as the hash function value of predicate hasAuthor. The word "hash" is used herein as meaning that there is a mechanism or algorithm that is used to insert the data into the hashtable 500. There are many types of hash functions already defined and known in the art and the method of the present invention is not dependent on using any specific hash function or type of hash function.

One simple hash function might be, for example, simply listing all predicates for a subject in a listing, with the hash value of a predicate to be inserted being related to the sequence number of that predicate in the listing, up to the number of column-pairs in the hash table, and relying on the overflow capability for any remaining predicates. Other hashing algorithms are possible, and Appendix I includes a more complete description of a computerized insertion of triples into the hashtable, including exemplary coding used for the insertion processing.

FIG. 6 shows how, when a triple is inserted, the predicate is hashed to a position in the hashtable. In FIG. 7 is demonstrated that, if the position is occupied 700, linear or quadratic probing used to find an empty location in the hashtable. For retrieval of data from the hashtable, if the predicate is unknown, scan all columns; otherwise, hash to retrieve the column.

FIG. 8 demonstrates a more realistic hash table 800 that includes a bitmap 801 and a predicate 802 having multiple values. The bitmap 801 is a mechanism that is indicates whether multiple values apply for a property. That is, if there are N property/value pairs in the hash, the bitmap will have N bits. For example, if the $i^{th}$ bit is set to "1", then this indicates that property_i (i.e., the property stored in this $i^{th}$ column) has multiple values for the subject in this current row, so value_i has an identifier (e.g., 3245167) that can be used on the secondary hash to find the row containing the list of objects for that subject and predicate_i. In contrast, if there is a single value for property_i, then it is stored directly in value_i and the $i^{th}$ bit in the bitmap is "0".

Therefore, FIG. 8 also demonstrates a predicate 802 in which the "Borders" relationship has more than one value. Thus, the dataset has several triples that indicate that Hawthorne borders to Mt. Pleasant, Elmsford, Thornwood, etc. Thus, FIG. 8 demonstrates that, if there is a single value for a subject/predicate pair (DBPedia: more than 81%), then the value is stored in the hashtable (e.g., NY); otherwise if there are multiple values, a reference to a secondary hash table (e.g., 3245167) is stored, where 3245167 uniquely identifies the subject (e.g., Hawthorne) and predicate (e.g., borders) in the primary hash table 800. Therefore, the bitmap will indicate a "1" in the position related to this predicate 802.

Because there is a hashing processing occurring for both hashtable 800, 900, the original hashtable 800 is referred to as the "primary hashtable" and the multiple-object hashtable 900 is referred to as the "secondary hashtable", since in this example, the secondary table is a hash over the values linked to Hawthorne by triples with the borders predicate.

FIG. 10 shows a summary of exemplary formats discussed above (e.g., (1) and (2) in the table) and also provides formats for two auxiliary tables (3), (4), referred to respectively as the "Overflow" table and the "LongNames" table.

The hash spill-out storage (e.g., the "Overflow" table) is created if the primary and secondary hashtables do not have enough space to fit the DB pagesize (max 32K). Additional triples are put in traditional three-column storage shown in (3). In the DBPedia dataset, this amounted to 1.7% of the triples.

If needed, the "Long strings" storage serves as a map between unique IDs and strings denoting subjects, predicates and values that are too long to store in the primary/secondary tables. As examples, the "long_names" table is used for storing long string data for resources and/or values, which typically refer to human-readable pieces of information about entities, such as comments or descriptions about the resources. For example, the resources in the DBpedia RDF database have associated abstracts, many of which are over 500 characters. Instead of using the actual resource or value name in the primary and secondary hashtables, which would take up too much space for these shortened tables, the solution adopted in the present invention is that used in other relational backed RDF stores, such as Jena f and Sesame, which involves computing an MD5 digest for a long string and then storing it and the original string in the long-names table.

The "rev_primary_hash" and "rev_secondary_hash" tables (e.g., (5) and (6) in FIG. 10) contain the triples of the RDF dataset as reversed in position compared to the primary and secondary hashtables described above, for facilitating certain query formats. That is, if a query of the type (?, p, o) is presented, there would have to be a complete scan of the primary hash relation and, for each row, a determination of whether predicate p is present, and then potentially looking into the secondary hashtable to determine if o is present.

The reverse primary hashtable and reverse secondary hashtable reverses the hashtable relations of the primary and secondary hashtables as based upon objects rather than subjects. That is, the data of the dataset is stored a second time, with the reverse hashtables being similarly constructed as briefly described above for the primary and secondary hashtables.

Therefore, optionally, reverse hashes can be defined in addition to the forward hashes of the primary and secondary hashtables. Forward hashes are well-suited for queries with unknown predicates and values. Reverse hashes have the same structure, but over the triple (Value, Predicate, Subject) and help to answer queries of the type (?, Predicate, Value) quickly.

It is also noted that indices can be generated that will expedite processing of the various tables during query processing. For example, in an exemplary embodiment that provided the details of Appendix I, the following index structures were generated for relationships (1)-(4) of FIG. 10:

1) a B-tree index on the resource column of primary hash;
2) a B-tree index on the res_prop_id column of secondary hash;
3) a B-tree index on each of the subject, predicate, and object columns of overflow; and
4) a B-tree index on each of the resource, md5 columns of long_names.

When a query is submitted with predicates in it, for processing via table scans, the predicate column names will be hashed and we will determine the column which will likely contain it. We will search from that column to the right till we get them or it is confirmed they are not there. Since all that is changing is the retrieval of the column values, it can be well hidden from the upper levels, which will not have to change.

For index-based accessing, standard techniques like index ANDing, ORing, or list processing will work, since they work out of record identifiers (also known as RIDs or rid's) and that is not changing. If, for a given subject id, we have more than (max columns−1)/2 predicates, then we can start a new row or use an overflow table which will be in the standard triple format.

An index will store the RID and, optionally, the column number where the column is present. If a predicate is not present, the RID will go under the NULL value. An easy search of predicates is thereby facilitated by the hash method, and the net result is that the index will, at a high level, look and feel similar to a conventional index.

Thus, in look and feel, the index for the predicates would be like any other relational store (like DB2) index. An improvement would be to add the exact column number where we found this predicate for the record as an additional field for the record in the index. This would mean, when we want to access it via the index, we will know where exactly it is stored.

As previously described, if a subject has two or more predicates which have the same hash value, then they will occupy an adjacent column to the right. This way, when a query needs a particular predicate value, we will know which column will likely contain it. If it is not there (due to collision) we can check the column to the right until we hit or end up with a predicate stored which has a different hash value.

That is, there are three possible cases here every time we move one element to the right: (1) we hit the predicate we were looking for; (2) we hit an "empty" space (a NULL value) for that column, in which case the predicate we are searching for does not exist for this row; or (3) we hit a different predicate than we were looking for, in which case we are also guaranteed that the predicate we are looking for does not exist in this row.

A record thus created can be compressed using standard compression techniques like DB2's row compression since DB2 compresses records one record at a time. To clarify this, the maximum number of predicates per subject (i.e., per row) might be 450. However, many (if not most) of the subjects will have way under 450 predicates. This means that for such subjects, the remaining columns (up to 900) will be empty space (filled by NULL values). Thus, if a subject has only 200 predicates, instead of reserving large amounts of space for the remaining 250 predicates (space which would be empty), compression keeps this extra space to a minimum (the ratio depends on the engine).

That is, the issue with compressing one record at a time is that not all subjects (i.e., rows) will have the empty spaces in the same columns—because not all subjects have the same predicates. So on row 1, columns 100-200 maybe empty, whereas for row 2, columns 200-300 may be empty. An engine that does not compress one row at a time cannot efficiently compress space in this case, the reason being that you need to account for each row's particular layout of filled/empty columns when you compress.

It is noted that, in contrast, there are other engines which compress data as a column at a time, or a mixture of row and column data. For row compression to work well, row sizes within the capability of the engine, which very much holds in the example case described here, since the 901 columns of this example are easily handled by the DB2 engine.

Figure 11:
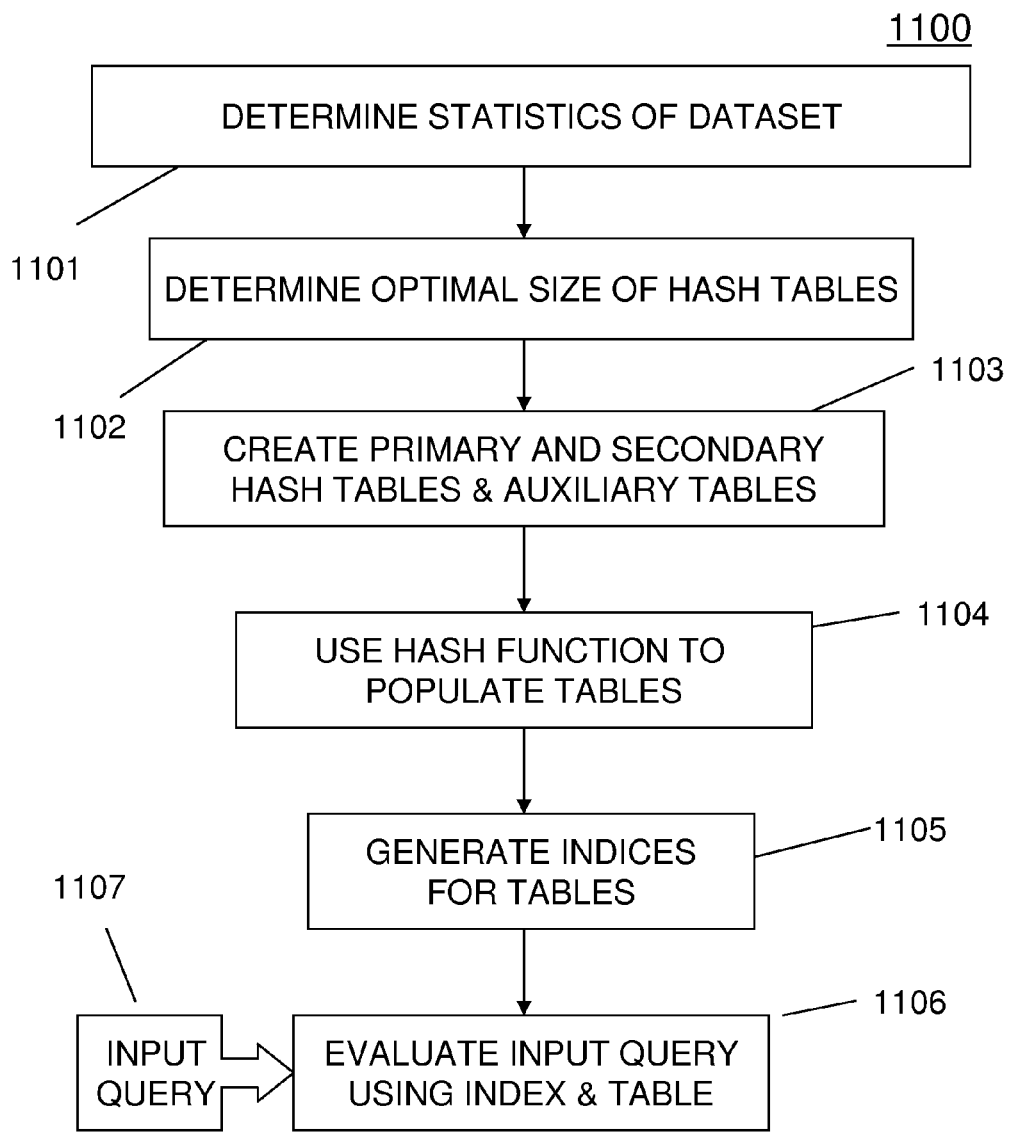
FIG. 11 an exemplary flowchart 1200 that would implement the method of the present invention as a software application program.

FIG. 11 shows an exemplary flowchart 1100 for the method described above, as implemented on a computer. In step 1101 the store is analyzed to determine statistics of the schema-less dataset. In step 1102, an optimal number of columns is determined for the primary hash table. In step 1103, the primary and secondary hash tables and an overflow table and string table are created, and, in step 1104, the data is inserted into the appropriate tables. In step 1105, reverse hash tables optionally can likewise be created and populated. In step 1106, indices can be generated for the tables, as a way to expedite processing of queries. In step 1107, a query is received and processed, using whichever of the generated tables is required for the type of query entered, as expedited by using index tables, if set up, so that the query result can be provided as output.

Relative to the automatic calculation of table size, in an exemplary implementation of the concepts of the present invention, using an RDF dataset, the subject of the discussion in Appendix I, a 235-line Java component was implemented that computed the statistics on the RDF dataset, recommended optimum hash table sizes and created the required relational schema. The hash table sizes were chosen based on the average and standard deviation of:

The number of properties per subject for the size of the direct primary hash;

The number of values per subject and property for the size of the direct secondary hash;
The number of properties per object for the size of the reverse primary hash; and
The number of properties and subjects per object for the size of the reverse secondary hash.

A goal was to select a prime number close to the average plus three standard deviations, while maintaining overflow at or under 1% of triples.

Figure 12:
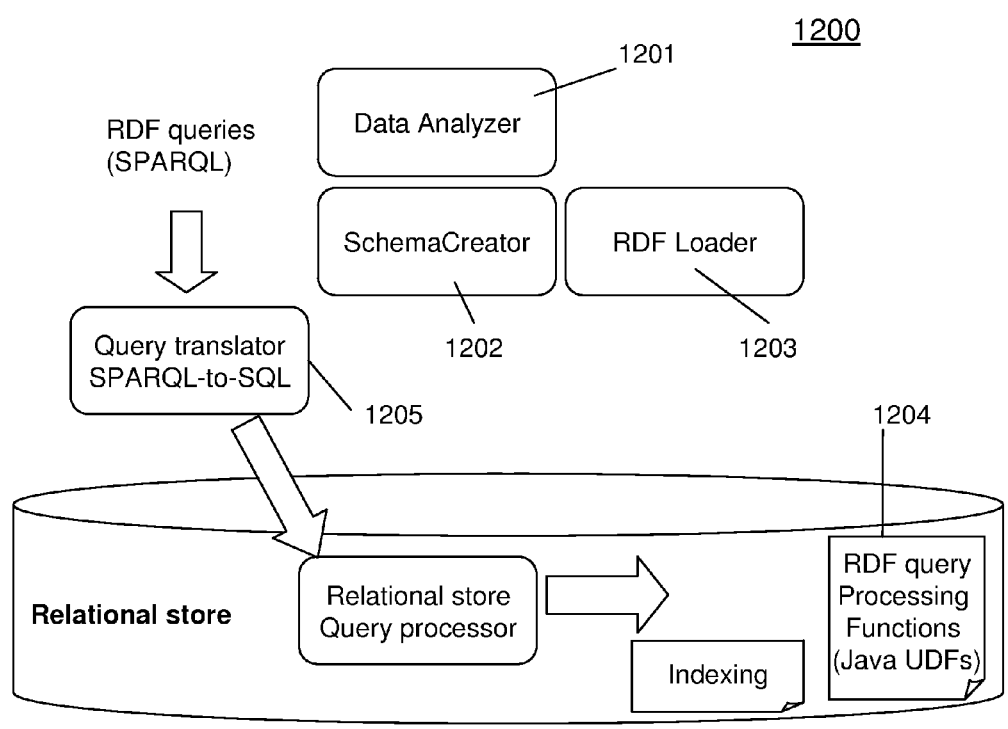
FIG. 12 shows an exemplary system architecture 1300 to implement the present invention, including query processing.

FIG. 12 shows an exemplary system architecture 1200 of the present invention. All components can be called as utilities, but also have Java APIs. Data Analyzer 1201 analyzes RDF data to determine optimal schema parameters for issues such as the number of column for each hash, need for auxiliary tables, etc. Schema Creator 1202 takes the parameters from the Data Analyzer and creates the schema for RDF data. RDF Loader 1203 transforms RDF data in a format suitable for LOAD-like utilities and executes LOAD commands.

All Java UDFs (User-Defined Functions) 1204 are written in Java that process one-triple queries. These are called by the SQL translation of an RDF query. Either default or specialized indexes may be used in the process. Query Translator 1205 translates SPARQL queries into standard SQL that uses the Java UDFs.

Exemplary Software Implementation

Figure 13:
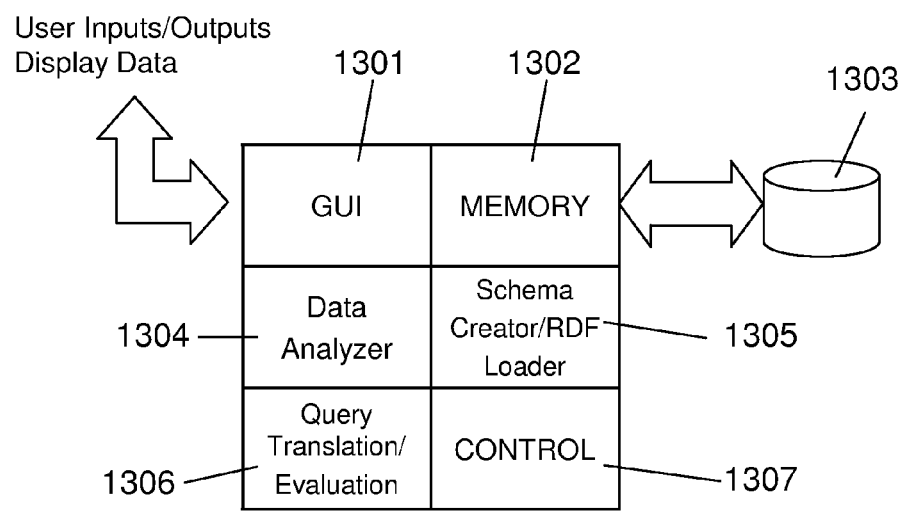
FIG. 13 shows an exemplary block diagram 1300 of a software embodiment of the present invention.

FIG. 13 shows an exemplary block diagram 1300 of a software application program that might be used to implement the method described in the flowchart 1100 of FIG. 11. Graphical User Interface (GUI) module 1301 permits the user to provide control and data inputs as well as providing display data. Memory Interface module 1302 provides interface with a memory system 1303 that stores the RDF dataset and the table and index of the method of the present invention.

Data Analyzer module 1304 computes statistics on the RDF dataset, recommends optimal hashtable sizes and creates the required relational schemes. In an exemplary embodiment further described in the appendices, this component was implemented as a 235-line Java component. The SchemaCreator/RDFLoader component 1305 takes an RDF document represented in the Notation3 format and create comma separated value files that can be bulk-loaded (using the LOAD command) into the direct, reverse and auxiliary (e.g., overflow, secondary, longString) tables.

Query Engine module 1306 provides the analysis of an input query over the table and indices. In the exemplary embodiment conveyed in the appendices, this module consists of Java implementations of table user-defined functions loaded into DB2 and the translation from SPARQL, to the corresponding SQL query. This exemplary query engine was implemented in 1043 lines of code.

Control module 1307 provides overall control of the various software modules, as based upon user inputs and the RDF dataset stored in memory 1303. These software modules would, of course, be stored in memory 1303 and extracted as necessary and executed by a processor on a computer.

Exemplary Hardware Implementation

Figure 14:
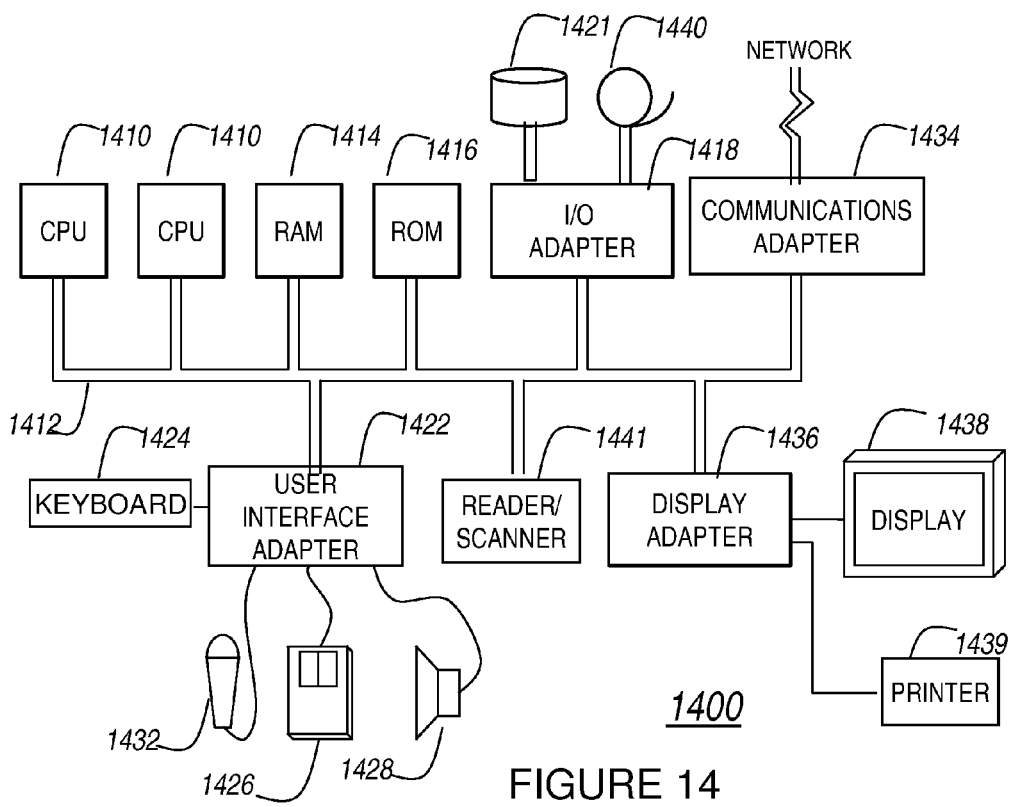
FIG. 14 illustrates an exemplary hardware/information handling system 1400 for incorporating the present invention therein.
Figure 15:
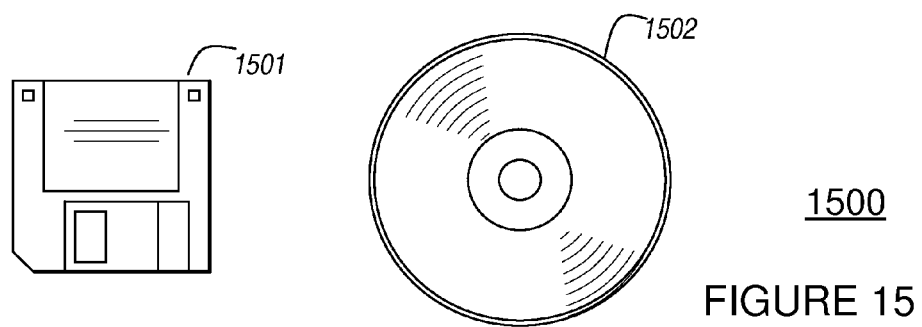
FIG. 15 illustrates a signal-bearing storage medium 1500 for storing machine-readable instructions of a program that implements the method according to the present invention.

FIG. 14 illustrates a typical hardware configuration of an information handling/computer system 1400 in accordance with the invention and which preferably has at least one processor or central processing unit (CPU) 1410.

The CPUs 1410 are interconnected via a system bus 1412 to a random access memory (RAM) 1414, read-only memory (ROM) 1416, input/output (I/O) adapter 1418 (for connecting peripheral devices such as disk units 1421 and tape drives 1440 to the bus 1412), reader/scanner 1441, user interface adapter 1422 (for connecting a keyboard 1424, mouse 1426, speaker 1428, microphone 1432, and/or other user interface device to the bus 1412), a communication adapter 1434 for connecting an information handling system to a data processing network, the Internet, an Intranet, a personal area network (PAN), etc., and a display adapter 1436 for connecting the bus 1412 to a display device 1438 and/or printer 1439 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing storage media tangibly embodying a program of machine-readable instructions executable by a digital data processor incorporating the CPU 1410 and hardware above, to perform the method of the invention.

This signal-bearing storage media may include, for example, a RAM contained within the CPU 1410, as represented by the fast-access storage for example.

Alternatively, the instructions may be contained in another signal-bearing storage media 1500, such as a magnetic data storage diskette 1501 or optical storage diskette 1502 (FIG. 15), directly or indirectly accessible by the CPU 1410.

Whether contained in the diskette 1501,1502, the computer/CPU 1410, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing storage media, including memory devices in transmission media, such as communication links and wireless devices, and in various formats, such as digital and analog formats. In an illustrative embodiment of the invention, the machine-readable instructions may comprise software object code.

The Present Invention Compared to Other Methods

In the following section and having explained an exemplary embodiment of the method of the present invention, this method now is compared with other methods discovered during the preparation of the present application.

US Patent Publication No. US 2005/0223022 to Weissman, et al., "Custom Entities and Fields in a Multi-Tenant Database System", describes a system and method for hosting variable schema data in a fixed physical database schema for Multi-tenant Database System. In their scheme each organization may add or define custom fields for inclusion in a standard object. The metadata is stored separately.

In publication entitled "Jena Property Table Implementation", by Kevin Wilkinson, is described a property table that compromises one column containing a statement subject plus one or more columns containing property values for that subject. It provides a performance advantage compared to a triple store for large RDF graphs with frequent patterns, but at a loss in flexibility and additional storage cost. It is also difficult to fit this scheme well in a relational table with its set limit of columns.

The Jena method described in the Wilkinson publication supports three types of property tables:

a) single values property table for properties prop1 . . . propn [subject|obj1|obj2| . . . |objn]. Each property column may store an object or be null. Each row represents as many RDF statements as it has non-null property values;

b) multi-values property table for some property propj [subject|obj]—Store a single property that has a maximum cardinality greater than one (or that is unknown);

c) property-class table for single-values property prop1 ... propn [subject|obj1| ... |objn|type].

Applications must know in advance which properties are single valued and which is multi valued and this results in a loss of flexibility. This paper talks about the fact that in principle one could have single value and multi value properties in a single tables but does not give details and puts it down as future work.

In contrast to the method of Jena, in the method of the present invention, a property does not have a fixed position in the table as the property table described above. Thus, the present invention can use a smaller table to store a large set of sparse properties which this implementation will not be able to do. Also, the present invention does not have to specify the property names beforehand at table creation time whereas with this scheme one has to.

In a chapter from a book "Business Intelligence for the Real-Time Enterprises", entitled "Document-Centric OLAP in the Schema Chaos World" is described the use of rental columns for storing entities mapped to tuples of a single table. A rental column consists of two columns. The first contains the annotation and the second contains the value. There are three different types of rental columns entry rental, foreign rental and primary rental. In their case, for a class and schema, what the rental column denotes is fixed. consequently this scheme has a larger possibility of hitting the limit on number of columns in a table as well as a problem with null values.

In an article "DLDB: Extending Relational Systems To Support Semantic Web Queries" by Pan, et al., an approach is adopted that combines the property table approach with a horizontal class approach. In this case the property IDs serve as a table name, which is different from the method of the present invention, where there is a single table for all triples and property IDs serve as floating columns.

In U.S. Patent Application Publication No. 20090024654, entitled "Multi-Value Property Storage and Query Support", by Zhao, et al., is described a base table for single value properties associated with a user defined schema and a number of row-based tables for each different type of multi-value properties. A row-based table could have a group of compatible multi-value property tables. The approach of the present invention does not attempt to group triples in separate tables by property schema, but has a single table for all triples with a floating schema for properties.

In European Patent Publication No. EP1938211 entitled "Integrating RDF Data into a Relational Database System", Application No. EP20060750274, to Oracle Corporation, is described how to translate non-SQL queries into SQL queries that return a set of rows relevant to the non-SQL query. The description covers specification of RDF rules and covers building materialized views of S, V, O column triples tables, building indexes on the table, and applying query optimization on it. The method of the present invention uses a representation that is substantially different than the standard S,V,O this patent is working with.

The method described in U.S. Patent Application Publication No. U.S. 2009/0138498, entitled "RDF STORE DATABASE DESIGN FOR FASTER TRIPLET ACCESS" by Krishnamoorthy, et al., (Microsoft), adds columns for type and integrity checks to the traditional SVO columns, adds capability to specify 'information sources' to triples (provenance), and whether or not the triple can be reified.

The method described in "METHODS AND APPARATUS FOR QUERYING A RELATIONAL DATA STORE USING SCHEMA-LESS QUERIES" by Britton, et al. (Metatomix), EP1546921, translates schema less queries into (seemingly) structured queries in another schema.

The method described in "Method And System For Efficiently Storing Semantic Web Statements In A Relational Database" by Betz, et al., (IBM), US Patent Application Publication No. 2007/0198541, describes a representation that groups all RDF statements associated with a URI (associated with a subject or object), into one row. This is somewhat similar to the approach of the present invention, except that this work is using multiple tables, each for URIs of a specific type (for instance, group all Pets together, all Persons together). The approach of the present invention is novel in that it can store the dataset in a single table, by using the floating property columns concept.

U.S. Patent Application Publication US 2009/0132474, "Method and Apparatus for Optimizing Queries over Vertically Stored Database" (IBM), Ma, et al., describes a method to partition the larger RDF graph into subgraphs. A partition signature is created based on every edge in the subgraph, and queries are then broken down effectively to the partitions. This is primarily related to query optimization, whereas the method of the present invention is centered around the relational representation and using relational query optimization to answer queries.

The method of Dingley, U.S. Patent Application Publication No. US 2003/0145022, "Storage and Management of Semi-Structured Data", describes adaptations to a standard relational S,V,O store for RDF that migrates triples to dynamic auxiliary tables for high-frequency queries to reduce the number of rows being searched. In contrast, the method of the present invention stores all triples in a fixed set of tables, and reduces row accesses through indexing and reverse hashes.

U.S. Patent Publication No. 2009/0292716, entitled "APPARATUS, METHOD AND COMPUTER PROGRAM PRODUCT FOR PROCESSING RESOURCE DESCRIPTION FRAMEWORK STATEMENTS" to Oliver, et al., describes a method for dynamically provisioning/creating storage elements (e.g., tables, fields) for RDF statements that may contain values of different types and sizes. Particularly relevant for binary large objects in RDF, their storage scheme is oriented around object types and not triples.

U.S. Patent Publication No. 2006/0235823, entitled "Integrating RDF Data into a Relational Database System", to Chong, et al., describes how to change the TABLE function set for standard DBMS to integrate non-SQL queries (for instance, RDQL queries) into the SQL language.

U.S. Patent Publication No. 2008/0126397, entitled "RDF Object Type and Reification in the Database", to Alexander, et al., describes a method to store RDF in a relational database by reifying every RDF triple. The storage scheme of the present invention is substantially different, taking advantage of the fact that very few RDF triples in real world datasets are reified, therefore storing all triples with a common subject (or object) in a single row based on hashing of property columns.

U.S. Patent Publication No. 2004/0167904, entitled "Semi-Structured Data Storage Schema Selection", to Wen, et al., describes a method to create a database schema to store semi-structured data (in this case XML, but some claims also apply to RDF). The patent describes how a relational schema can be created out of a semi-structured schema (in this case XML schema). The approach of the present invention is different because it provides a relational schema and storage mechanism for RDF independently of what the schema of a particular RDF database is.

Test Evaluations

Experiments were run on the system as described above, using parameters set as in the following table.

| Parameter | Meaning | Value |
|---|---|---|
| N | size of direct primary hash | 127 |
| M | size of direct secondary hash | 73 |
| String length | size of any string column | 150 |
| N' | size of reverse primary hash | 113 |
| M' | size of reverse secondary hash | 89 |
| h | primary hash function | D.E.K. hash function[24] modulo N, N' respectively |
| h | primary hash function | D.E.K. hash function[24] modulo M, M' respectively |

We compared the performance of our implementation on conjunctive queries to that of Sesame 2.1, Virtuoso 5.0.9 OpenSource Edition native store, Jena TDB and Jena SDB. All queries were executed using the Java API provided by each system. For our implementation, we issued queries via JDBC, for Sesame we used the SAIL API and for Virtuoso using the SPARQL Protocol client API. Before issuing the queries, we selected 15% of the queries uniformly at random and issued them against each system to warm up caches. For each query, we measured its running time excluding the time taken to stream back the results to the API, in order to minimize variations caused by the various APIs available. We also compared the results for each query for all five systems and ensured that all result sets were identical. All the query running times reported are an average over three independent runs.

Our experiments were conducted on a 4 way 3.2 GHz Intel Dual Core Xeon system with 20 GB of memory running 64 bit Linux. For Sesame, we added the following indexes: spoc, posc, opsc, where s stands for subject, p predicate, o object, and c stands for context for the graph. For Virtuoso, we created an extra index on cpos, which was supposed to help queries with just the graph or the predicate specified as constants. We also set the following parameters as per Virtuoso's recommendations for performance tuning on large datasets:

NumberOfBuffers=1500000
MaxDirtyBuffers=1200000
MaxCheckpointRemap=1500000
DefaultIsolation=2

For Jena TDB, we used version 0.8.1 over Joseki [25] version 3.2, using the statistics-based optimization strategy. For Jena SDB, we used version 1.2.0 over the layout2/hash store layout (this proved faster than then index layout), over Joseki 3.2 and DB2 9.5 as the relational back-end with the same configuration as the experiments for our implementation. Indexes were generated using sdbconfig.

For our system, we used DB2 9.5 Enterprise Edition as the relational database engine. We used the default DB2 9.5 settings for a Linux 64-bit system as set by the installation process. Based on the DBPedia 3.1 statistics, we chose the system parameters outlined in Table II. Note that the hashtable sizes are prime numbers—this tends to minimize the number of collisions even for hash functions that are more collision-prone. Hashtable sizes were chosen based on the considerations discussed previously.

Our aim for hashtable size selection was to select a prime number close to the average plus three standard deviations, while maintaining overflow at or under 1% of triples. We chose a hashing function described by Donald E. Knuth[24] because it had the fewest collisions on a test over approximately 3% of the DBPedia 3.1 dataset. The measured query times include the transformation to/from MD5 hashes.

Analysis

We measured the average running time over the entire set of queries for all five systems. Sesame averaged 88.87 ms per query, with a standard deviation of 7.13 ms; Virtuoso averaged 76.81 ms per query, with a standard deviation of 7.89 ms; our implementation averaged 65.73 ms per query, with a standard deviation of 5.78 ms; Jena TDB averaged 95.63 ms per query, with a standard deviation of 8.14 ms; Jena TDB averaged 93.1 ms per query with a standard deviation of 6.74 ms. On the average, our representation showed a 26.06% improvement over Sesame (standard deviation of 3.03%), a 14.45% improvement over Virtuoso (standard deviation of 2.97%), a 31.24% improvement over Jena TDB (standard deviation of 1.43%) and a 29.4% improvement over Jena SDB (standard deviation of 1.87%). Next, we grouped the queries by selectivity, size and complexity to show average running time comparisons.

We also measured the disk space taken by the entire RDF dataset, including any indices built on each system. DBPedia 3.1 required 21.47 GB of disk space for our representation without any compression of the direct and reverse hashtables. The dataset required 17.76 GB of space for Sesame, 19.4 GB of space for Virtuoso, 12.5 GB for Jena TDB and 14.9 for Jena SDB. In terms of the memory footprint, our system used a maximum of 631 MB (including the heap for the application issuing queries), Sesame used 661 MB, Virtuoso 714 MB, Jena TDB 494 MB and Jena SDB 765 MB of RAM.

In conclusion, we demonstrated a method for representing RDF data in a relational database that outperforms the native stores of Sesame 2.0.1, Virtuoso 5.0.9 OpenSource Edition, Jena TDB and Jena SDB by 26%, 14%, 31% and 29% respectively in terms of average query processing time. Our experimental analysis shows these gains in performance over a set of over 72,000 queries are achieved at the expense of a modest increase in database size compared to the native stores, and with a comparable memory footprint.

CONCLUSION

In view of the above summaries of some related conventional methods and the experimental results described above, the present invention provides a mechanism so that one could now use a standard relational store to store RDF data and yet get great performance. This is a great advantage, since companies can reuse the skills of its available manpower, who know relational systems, rather than have to learn yet a new system.

Moreover, relational systems come with proven compression, scalability, recovery, and concurrency control, which can all be used without having to reinvent the wheel for RDF. Thus, one can get very good performance in comparison to even native RDF stores, which is a certain advantage.

The same techniques described herein can also be extended to other schema-less storage requirements, such as multi-tenancy and document stores using one scheme. For multi-tenancy, it means one can customize not only for multiple customers (tenants) but also for schema-less storage for a customer which current schemes cannot handle, meaning that they can handle multi-tenancy but not schema-less inside.

While the invention has been described in terms of a single exemplary embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method of storing schema-less data of a dataset in a relational database, said method comprising creating a relational table for said schema-less data, using a processor on a computer, wherein:
    each row of said relational table will be dedicated to a subject of said schema-less data in said dataset;
    each row of said relational table comprises a hashtable containing properties and values of the subject for that row; and
    at least one of said property and its value associated with said subject in said row is to be stored in a pair-wise manner in that row of said relational table.

2. The method of claim 1, further comprising:
    exercising a hash function on data in said dataset to construct said hashtable for each said row of said relational table; and
    inserting said data of said dataset into each row of said relational table in accordance with results from said hash function.

3. The method of claim 2, wherein said relational table has a predetermined number of columns, said method further comprising:
    creating an overflow table to store data of subjects having data for said other entities greater in number than that of said predetermined number of columns.

4. The method of claim 3, wherein said relational table comprises a primary relational table, said method further comprising:
    creating a secondary hashtable for each subject and property for which the dataset specifies more than one value; and
    storing all such hashtables for all subjects and properties with more than one value of said dataset in a secondary relational table.

5. The method of claim 4, further comprising:
    generating a longString storage for objects having long string data.

6. The method of claim 5, further comprising:
    receiving a query; and
    processing said query, using said data inserted in said primary relational table, said secondary relational table, said overflow table, and said longString table.

7. The method of claim 5, further comprising:
    receiving a query; and
    processing said query, using said data inserted in said primary relational table, said secondary relational table, said overflow table, said longString table, and at least one index generated to expedite a processing of queries.

8. The method of claim 4, further comprising:
    generating at least one index of data in at least one of said primary relational table, said overflow table, and said secondary relational table, to expedite processing of queries.

9. The method of claim 3, further comprising storing at least one hashtable associated with a subject in a plurality of rows, for purpose of efficiency in query processing, as determined by a processor on said computer.

10. The method of claim 2, further comprising:
    resolving collisions occurring during insertion of data into said relational table, by systematically checking entity data storage in positions to the right of a collision location in a row of said relational table for a subject being inserted.

11. The method of claim 2, further comprising:
    creating at least one reverse relational table, said at least one reverse relational table based on having rows dedicated to objects rather than subjects in said dataset.

12. The method of claim 11, further comprising:
    receiving a query; and
    processing said query, using said data inserted in said relational table and said at least one reverse relational table.

13. The method of claim 1, wherein said dataset comprises tuples of a Resource Description Framework (RDF) format, said RDF format comprising tuples using a triple format (subject, predicate, object).

14. The method of claim 1, further comprising:
    preliminarily using said processor to evaluate characteristics of data in said dataset; and
    using said processor to determine a maximum size of the hashtable for each said subject, meaning a number of columns, to be used in said relational table, to optimize efficiency of storage and data retrieval.

15. The method of claim 14, wherein said number of columns is determined based on at least one of an average and a standard deviation of data of said dataset.

16. An apparatus, comprising:
    a processor to receive and execute machine-readable instructions; and
    a storage device to store said machine-readable instructions for execution by said processor,
    wherein said machine-readable instructions cause said processor to execute a method of storing schema-less data of a dataset in a relational database, said method comprising:
        creating a relational table for said schema-less data, using said processor;
        exercising a hash function on data in said dataset; and
        inserting said data of said dataset into said relational table in accordance with results from said hash function,
        wherein:
            each row of said relational table is dedicated to a subject of said schema-less data;
            each row of said relational table comprises a hashtable containing properties and values of the subject for that row; and
            at least one of said property and its value associated with said subject in said row is to be stored in a pair-wise manner in that row of said relational table.

17. The apparatus of claim 16, wherein said relational table has a predetermined number of columns and comprises a primary relational table, said method further comprising one or more of:
    creating an overflow table to store data of entities for subjects having entity data greater in number than that of said predetermined number of columns;
    creating a secondary relational table for storing subjects and properties having more than one object value;
    generating a longString storage for objects having long string data;
    creating at least one reverse relational table, said at least one reverse relational table based on having rows dedicated to objects rather than subjects in said dataset; and
    generating at least one index of data in at least one of said primary relational table, said overflow table, said secondary relational table and said at least one reverse relational table, to expedite processing of queries.

18. The apparatus of claim 17, further comprising:
at least one input device to receive an input query; and
at least one output port to transmit a result of processing said query,
wherein said method further comprises:
  using data in one or more of said relational table, said overflow table, said secondary relational table, said longString storage, said reverse relational table, and at least one said index to process said input query; and
  providing a result of said processing said input query to said output port.

19. The apparatus of claim 18, wherein said dataset comprises tuples of a Resource Description Framework (RDF) format, said RDF format comprising tuples using a triple format (subject, predicate, object).

20. A tangible storage device tangibly embodying a set of machine-readable instructions to execute a method of storing schema-less data of a dataset in a relational database, said method comprising:
creating a relational table for said schema-less data, using a processor;
exercising a hash function on data in said dataset, using said processor; and
inserting said data of said dataset into said relational table in accordance with results from said hash function,
wherein:
  each row of said relational table is dedicated to a subject of said schema-less data of said dataset;
  each row of said relational table comprises a hashtable containing properties and values of the subject for that row; and
  at least one property and its value associated with said subject in said row is to be stored in a pair-wise manner in that row of said relational table.

21. The storage device of claim 20, wherein said relational table has a predetermined number of columns and comprises a primary relational table, said method further comprising one or more of:
creating an overflow table to store entity data of subjects having entity data greater in number than that of said predetermined number of columns;
creating a secondary relational table for storing object data as a listing for entities having more than one object value;
generating a longString storage for objects having long string data;
creating at least one reverse relational table, said at least one reverse relational table based on having rows dedicated to objects rather than subjects in said dataset;
generating at least one index of data in at least one of said primary relational table, said overflow table, said secondary relational table and said at least one reverse relational table, to expedite processing of queries;
receiving an input query;
using data in one or more of said relational table, said overflow table, said secondary relational table, said longString storage, said reverse relational table, and at least one said index to process said input query; and
providing a result of said processing said input query.

22. The storage device of claim 21, as embodied in one of:
a read only memory in a computer, as storing said machine-readable instructions for execution by said computer;
a random access memory (RAM) device on a computer, as storing said machine-readable instructions as a processor on said computer is executing said machine-readable instructions;
a read only memory (ROM) device in a computer, as storing said machine-readable instructions in preparation for transmitting said machine-readable instructions to a destination on a network; and
a standalone memory device storing said machine-readable instructions and intended to be inserted into a read drive of a computer to download said machine-readable instructions onto a memory of said computer.

* * * * *